United States Patent Office.

HENRY M. WESTMAN, OF EAST BOSTON, MASSACHUSETTS.

Letters Patent No. 108,661, dated October 25, 1870.

IMPROVEMENT IN CEMENTS FOR COATING AND PROTECTING WOOD.

The Schedule referred to in these Letters Patent and making part of the same.

*To all whom it may concern:*

Be it known that I, HENRY M. WESTMAN, of East Boston, in the county of Suffolk and State of Massachusetts, have invented a new and useful Improvement in Tar-Cement; and I do hereby declare that the following is a full, clear, and exact description thereof, which will enable others skilled in the art to make and use the same.

The nature of this invention consists in mixing the ingredients hereinafter named for forming a cement for coating wood, metal, and other substances, for protecting such substances from injury from the effects of the weather, water, insects, worms, &c.

To prepare the cement, I take one quart of pine-tar; one quart of tar-oil; three pounds of red lead; one-half pound of tallow; one pound of rosin; one pound of arsenic; one-half pound of sulphur; one quart of naphtha-oil.

*Mode of Preparation.*

Mix the red lead, tar, and tar-oil together; melt the tallow and rosin, and add the sulphur while warm. The composition is liquefied thoroughly by heat, and then strained. Then add the naphtha-oil and arsenic.

This cement protects wood and metalic surfaces (whether exposed to air or water) from oxidation, insects, and worms; prevents ships' bottoms from fouling, and is applicable to a great variety of purposes.

Having thus described my invention,

I claim as new and desire to secure by Letters Patent—

The compound or preparation, denominated tar-cement, of the ingredients, in the proportions, and for the purposes set forth.

HENRY M. WESTMAN.

Witnesses:
JAMES NUTE,
JAMES M. NUTE.